Figure 16:
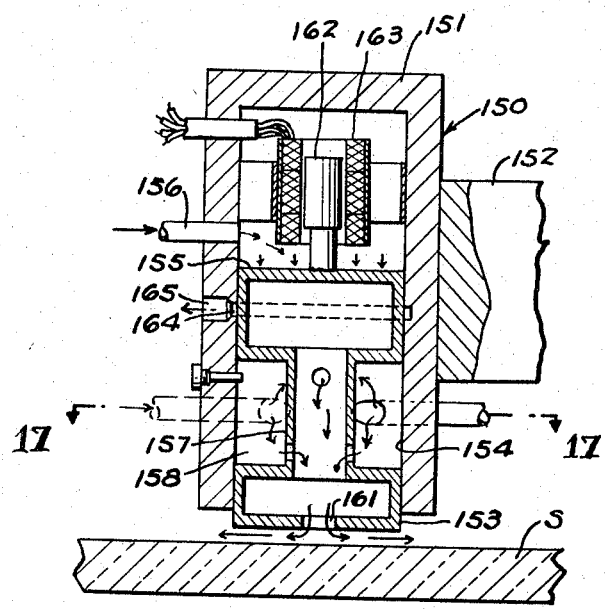

May 30, 1967 W. C. ALBERTSON, JR 3,321,838
GAUGING METHOD AND APPARATUS
Filed July 29, 1965 9 Sheets-Sheet 1
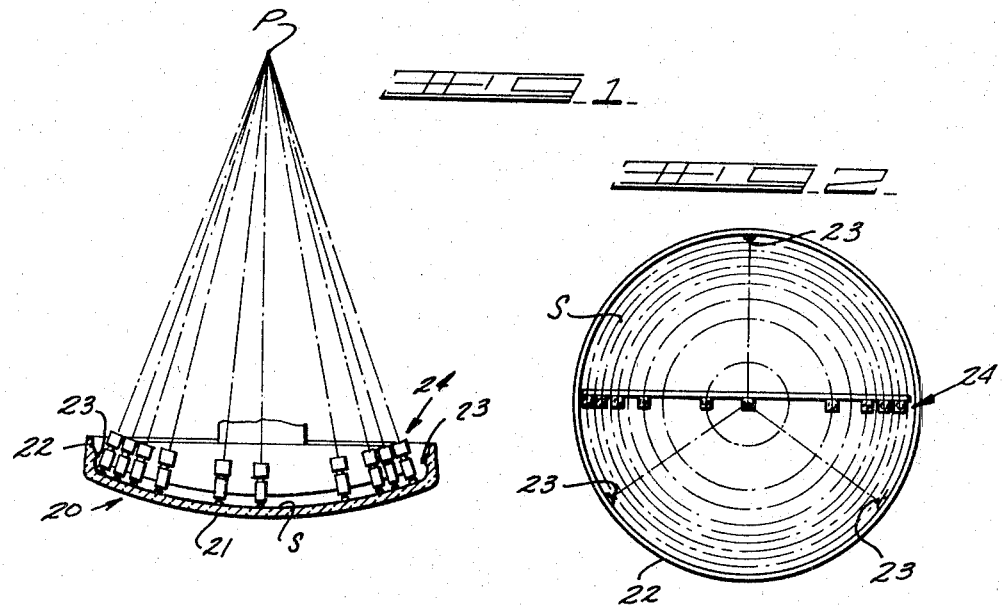
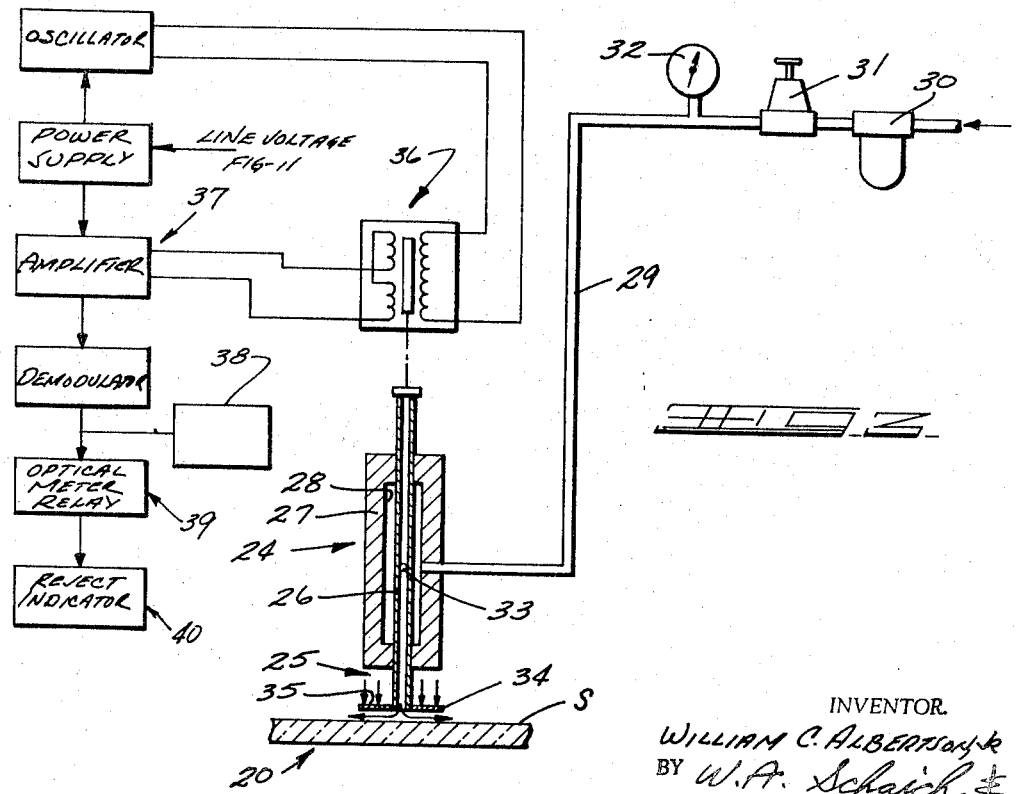
INVENTOR.
WILLIAM C. ALBERTSON, JR
BY W. A. Schaich &
Charles S. Lynch
ATTORNEYS

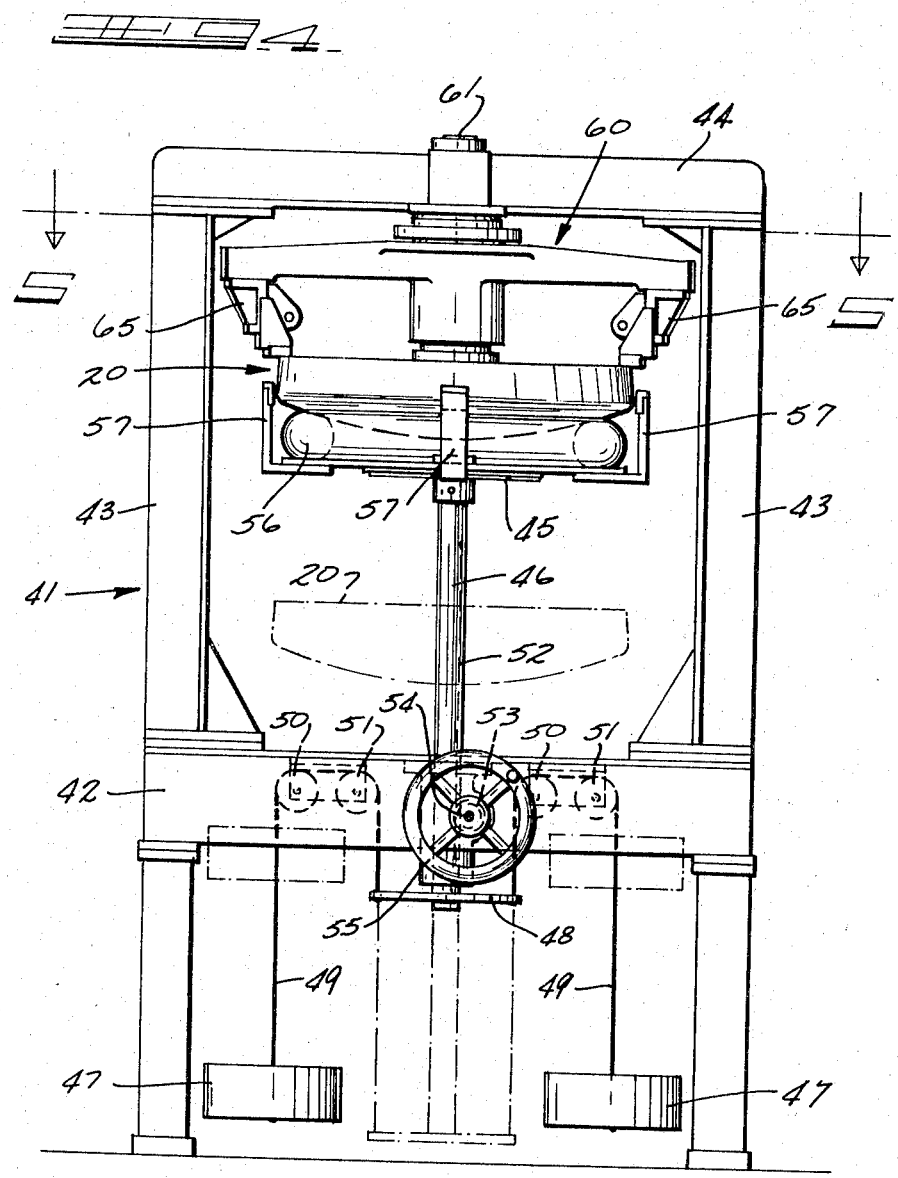

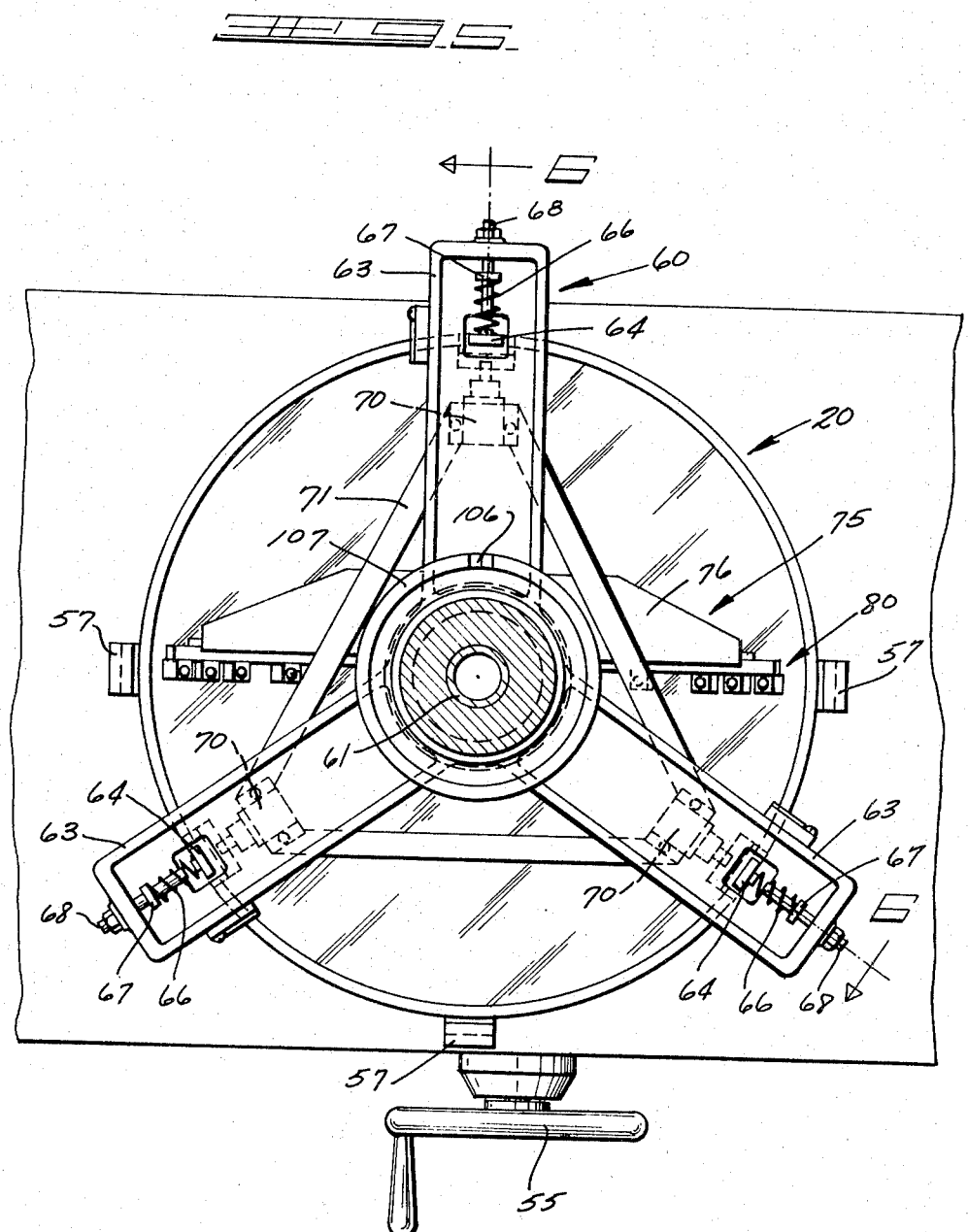

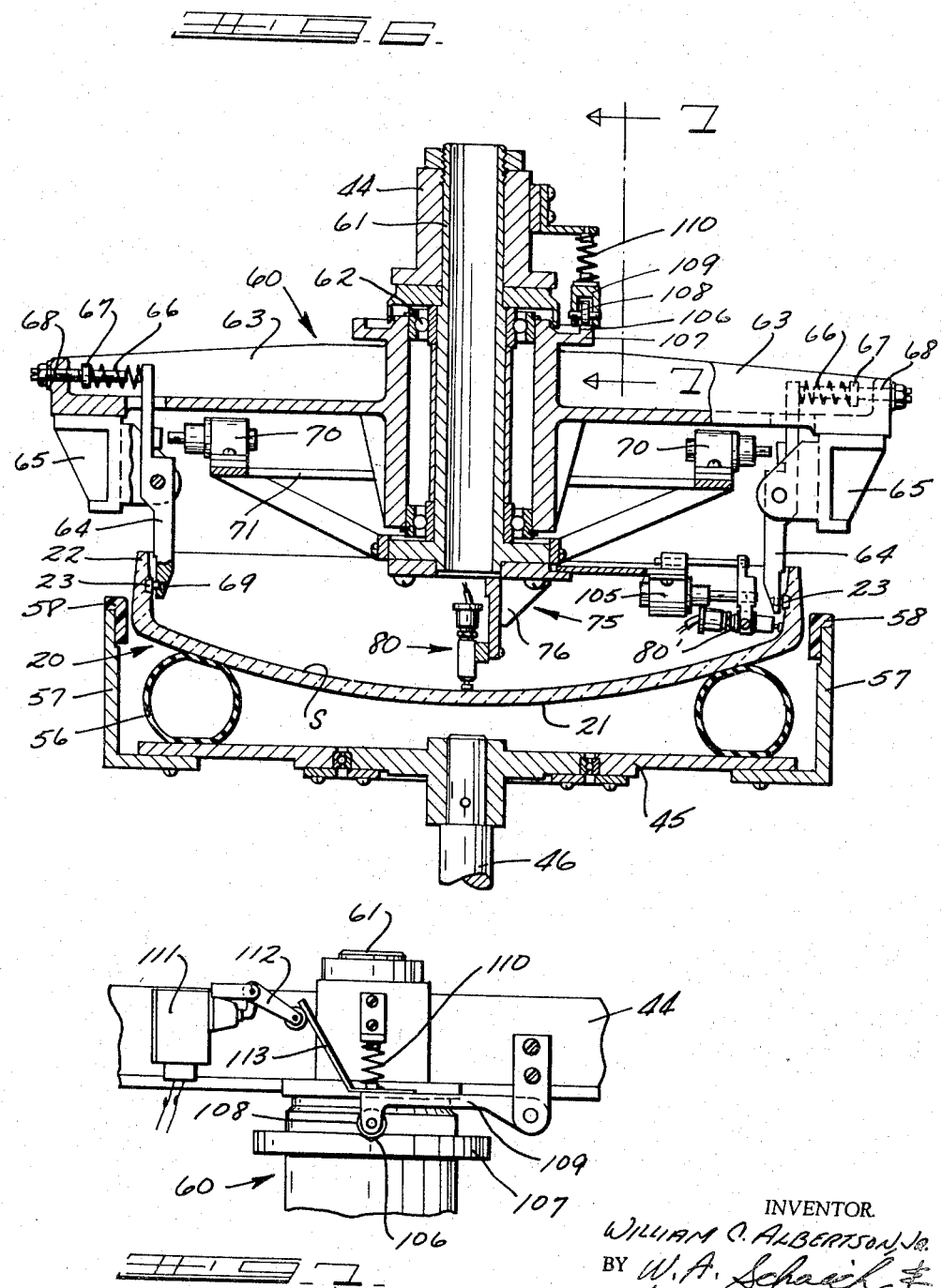

May 30, 1967   W. C. ALBERTSON, JR   3,321,838
GAUGING METHOD AND APPARATUS
Filed July 29, 1965                9 Sheets-Sheet 5
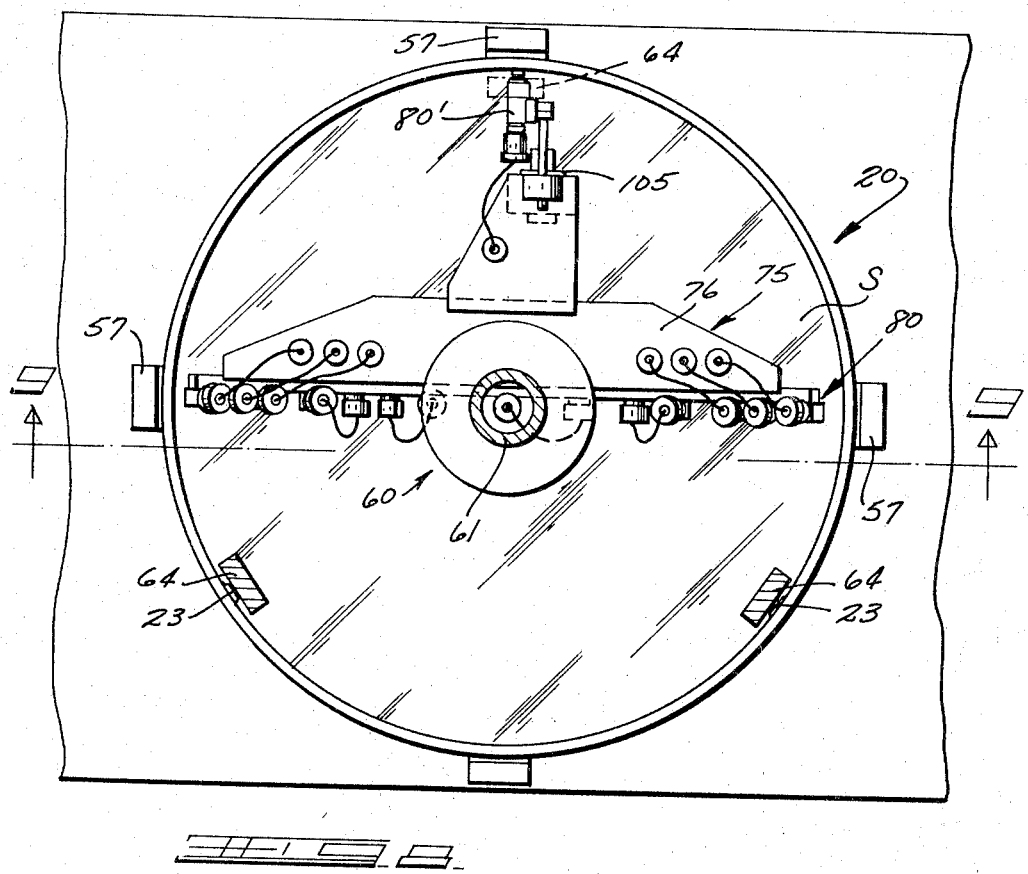
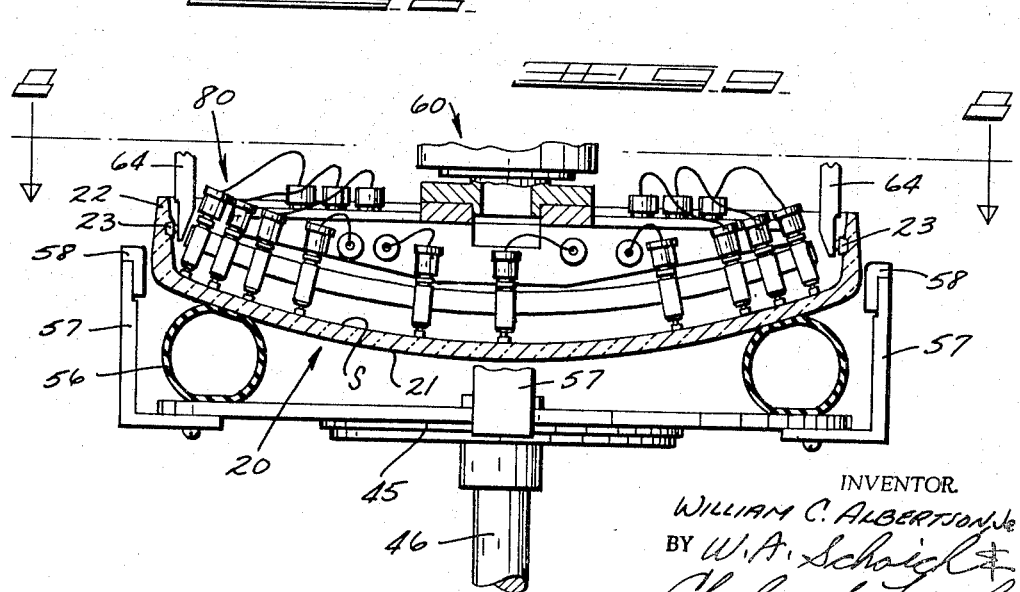
INVENTOR.
WILLIAM C. ALBERTSON JR
BY W. A. Schaich
Charles S. Lynch
ATTORNEYS May 30, 1967 W. C. ALBERTSON, JR 3,321,838
GAUGING METHOD AND APPARATUS
Filed July 29, 1965 9 Sheets-Sheet 6
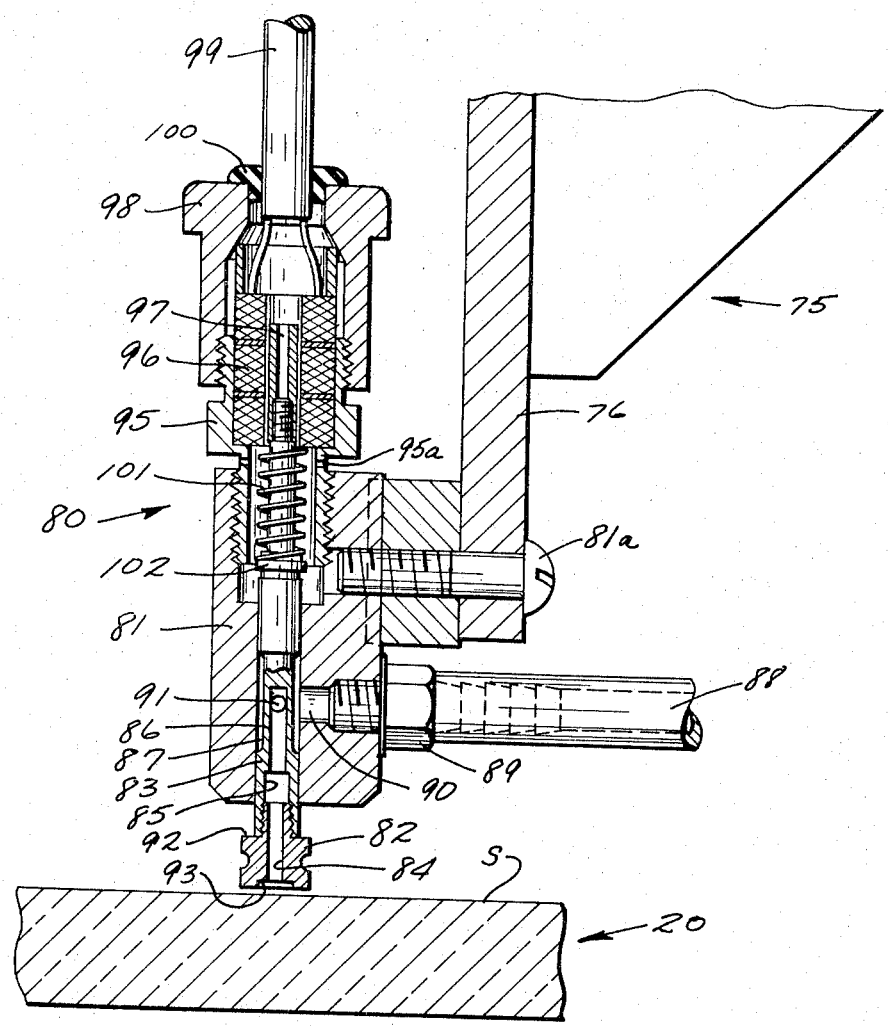
INVENTOR.
WILLIAM C. ALBERTSON, JR
BY W. A. Schaich &
Charles S. Lynch
ATTORNEYS May 30, 1967 W. C. ALBERTSON, JR 3,321,838
GAUGING METHOD AND APPARATUS
Filed July 29, 1965 9 Sheets-Sheet 7
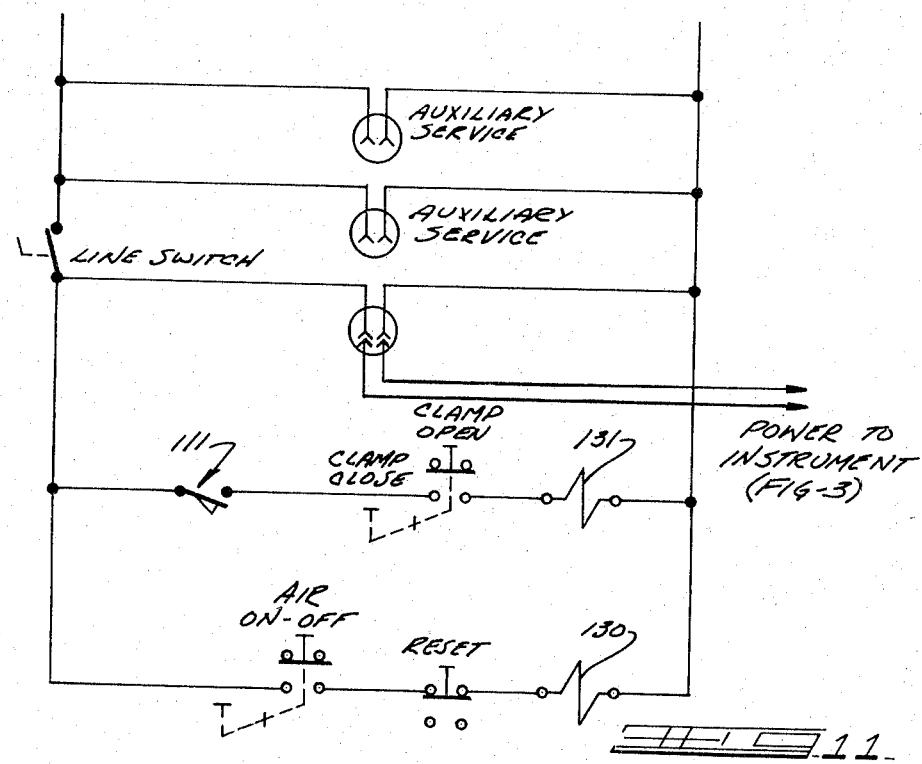
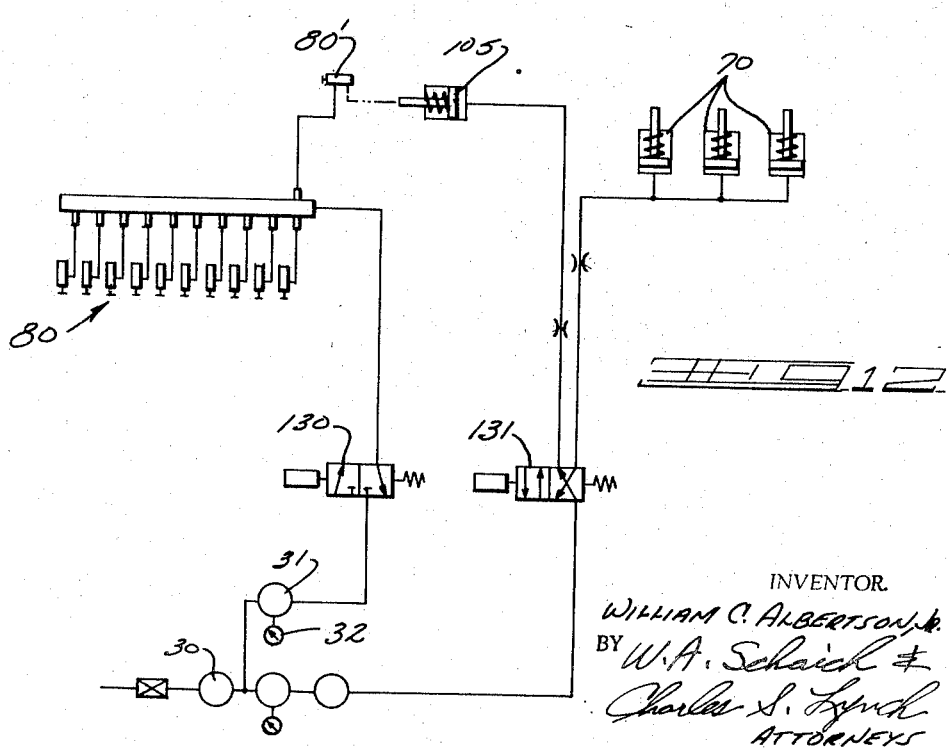
INVENTOR.
WILLIAM C. ALBERTSON, Jr.
BY W. A. Schaick
Charles S. Lynch
ATTORNEYS

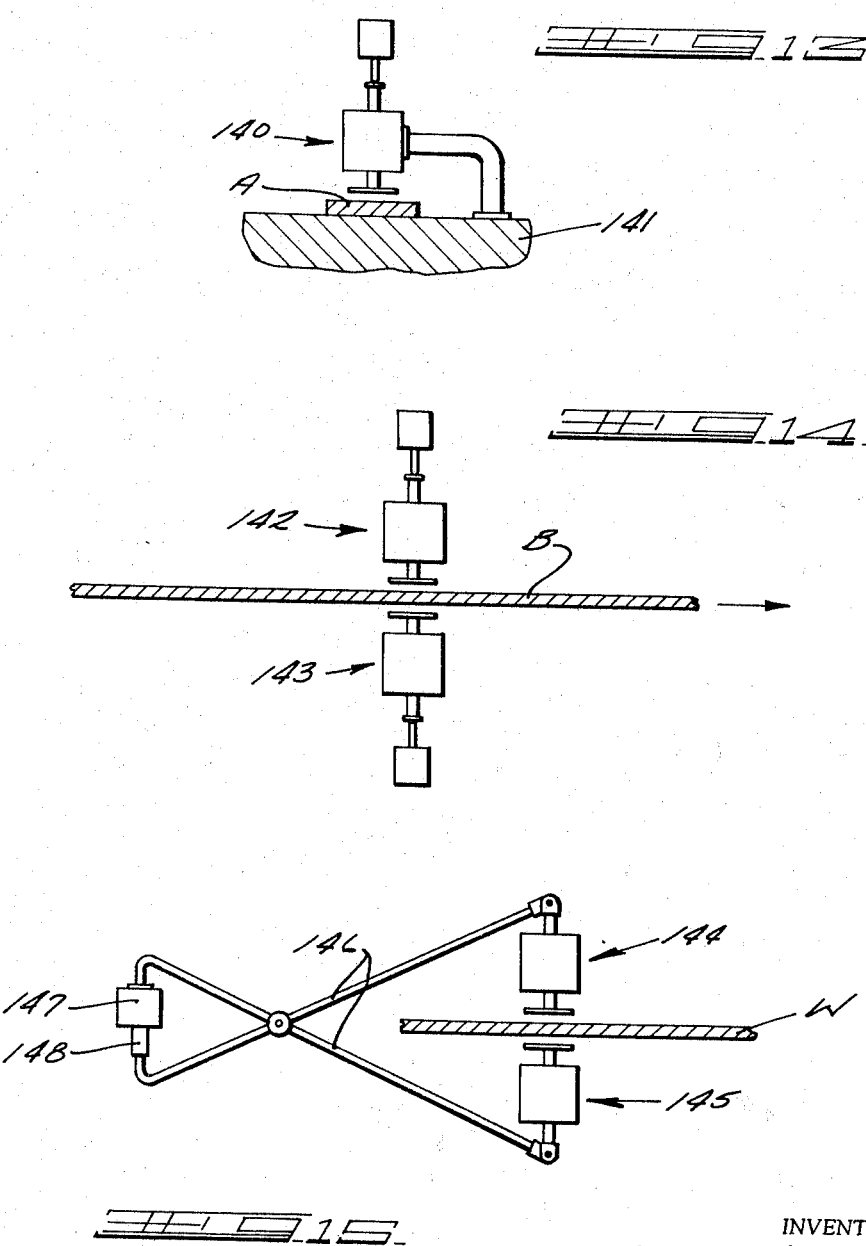

May 30, 1967     W. C. ALBERTSON, JR     3,321,838
GAUGING METHOD AND APPARATUS
Filed July 29, 1965     9 Sheets-Sheet 9

INVENTOR.
WILLIAM C. ALBERTSON, JR.

United States Patent Office 3,321,838
Patented May 30, 1967

3,321,838
GAUGING METHOD AND APPARATUS
William C. Albertson, Jr., Lakewood, Ohio, assignor to Owens-Illinois, Inc., a corporation of Ohio
Filed July 29, 1965, Ser. No. 475,660
17 Claims. (Cl. 33—174)

This application is a continuation-in-part of my application Ser. No. 400,451, filed Sept. 30, 1964 now abandoned.

This invention relates to gauging and particularly to inspecting the relative position of the surface of an article with relation to a fixed point without contacting the surface.

In the manufacture of various articles, it is desirable to be able to inspect the dimension or contour of a surface of an article without contacting the surface either because of the condition of the article or the degree of accuracy of the surface. Contacting gauges which have been heretofore used will scratch or mar the surface. It has heretofore been suggested that air gauges be used in which air is directed from a nozzle against a surface and as the surface varies by moving relatively toward and away from the nozzle, a variation in pressure occurs which is sensed. Such air gauges have substantial accuracy but are subject to the disadvantage that they are incapable of sensing wide variations in dimension.

It is therefore an object of this invention to provde a method and apparatus for inspecting the relative position of a surface of an article with respect to a fixed point without contacting the surface wherein the position of the surface may vary widely.

It is a further object of the invention to provide a novel sensing apparatus.

In the manufacture of glass cathode ray tube face plates which have a peripheral flange and a viewing portion, it is especially important that all portions of the internal viewing surface be at a predetermined distance with respect to the position of one or more electron guns. It has heretofore been suggested and such inspection has involved the use of micrometer dial gauges which contact the surface. In addition to being large, bulky and subject to inaccuracies and wear, such gauges contact the surface and therefore are liable to scratch or mar the surface.

It is therefore a further object of this invention to provide a method and apparatus for inspecting the internal surface of a cathode ray tube face plate without contacting the surface.

It is a further object of the invention to provide a novel apparatus for inspecting the surface of a cathode ray tube face plate.

Basically the method and apparatus involves positioning a sensing nozzle adjacent the surface to be inspected, directing air or similar fluid through the nozzle and causing the fluid to move laterally between the end of the nozzle and the surface being inspected so that the nozzle is levitated and achieves a position of equilibrium in predetermined spaced relation to the surface to be inspected. Thus, as the surface varies dimensionally, the nozzle follows the surface and the position of the nozzle, which corresponds to the position of the surface, can be sensed by any accurate gauging apparatus such as a differential transformer. In inspecting the face plate of a cathode ray tube, a plurality of sensing nozzles are positioned at radially spaced points relative to the surface and relative rotation is produced between the face plate and the nozzle so that circumferential areas of the face plate are inspected.

In the drawings:
FIG. 1 is a diagrammatic side view of the gauging of a cathode ray tube face plate.

Figure 17:
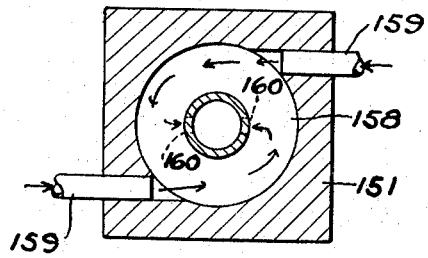

FIG. 2 is a diagrammatic plan view of the gauging of a face plate.
FIG. 3 is a schematic diagram of the sensing apparatus.
FIG. 4 is a side elevational view of an apparatus for gauging the internal surface of a cathode ray tube face plate.
FIG. 5 is a sectional view on an enlarged scale taken along the line 5—5 in FIG. 4.
FIG. 6 is a sectional view taken along the line 6—6 in FIG. 5.
FIG. 7 is a fragmentary view taken along the line 7—7 in FIG. 6.
FIG. 7 is a sectional view taken along the line 8—8 in FIG. 9.
FIG. 9 is a sectional view taken along the line 9—9 in FIG. 8.
FIG. 10 is a vertical sectional view through a sensing assembly utilized in the apparatus shown in FIGS. 5–9.
FIG. 11 is a schematic wiring diagram of the apparatus controlling system.
FIG. 12 is a schematic pneumatic diagram of the apparatus.
FIG. 13 is a schematic view of a modified form of gauging apparatus.
FIG. 14 is a schematic view of a further modified form of gauging apparatus.
FIG. 15 is a schematic view of a further modified form of gauging apparatus.
FIG. 16 is a vertical sectional view of a modified form of gauging head.
FIG. 17 is a sectional view taken along the line 17—17 in FIG. 16.

Referring to FIGS. 1 and 2, the invention is shown and described in connection with the gauging of the internal surface S of a cathode ray tube face plate 20 but may be utilized in connection with gauging the relative positions of the surfaces of various articles, as will become apparent hereinafter.

As shown in FIGS. 1 and 2, a cathode ray tube face plate 20 comprises a viewing portion 21 and a peripheral flange portion 22. When the face plate is utilized in connection with color television, it is provided with circumferentially spaced radially inwardly extending studs 23 which support the frame of a color controlling element or mask as is well known in the art. In use, it is essential that all portions of the viewing surface S, which constitutes the viewing screen when suitable phosphors are adhered, be in predetermined relation to a point P where the electron gun or guns are positioned in the complete cathode ray tube. Accordingly, in the manufacture of face plates 20, the face plates are inspected to ascertain the relative positions of portions of the surface S. In any circumferential radial circle, as shown by broken lines in FIG. 2, the contour of position of the surface cannot vary from point P beyond a predetermined standard.

In accordance with the invention, the face plate 20 is supported in predetermined relation by means of the studs 23 and a plurality of sensing assemblies 24 are provided adjacent the internal surface S at radially spaced points. Relative rotation is then produced between the assemblies 24 and the face plate 20 so that the circumferential or concentric ring-like portions of the face plate are inspected.

In accordance with the invention, each sensing assembly 24 is constructed as shown diagrammatically in FIG. 3 and comprises a sensing nozzle 25 that includes a stem 26 which is mounted for reciprocating movement in a housing 27. Each housing 27 is in predetermined fixed relation to studs 23 of the face plate 20. The housing 27 is provided with a cavity 28 to which fluid, such as air, is supplied through line 29 from a source, not shown, through a dirt filter 30, a pressure regulator 31 and past a pressure gauge 32. The stem 26 has its upper end closed and is provided with a radial opening 33 through which the air may pass from line 29 and chamber 28 into the stem 26. The lower end of the stem 26 is open forming the nozzle and a flange or plate 34 is provided adjacent the periphery of the lower end of the stem to define a pressure surface 35.

The surface S to be gauged is positioned adjacent the end of the nozzle 25 so that when air is supplied through the stem 26, the air issues through the gap between the plate 34 and the surface S, as shown by the arrows. The velocity of the air increases and the lateral pressure diminishes as the air moves between the plate 34 and surface S. As shown by the arrows on the plate 34, the pressure of the ambient pressure or atmospheric pressure upon the top surface of the plate 34 and other exposed portions of stem 26 produces a force that holds the plate in place adjacent but spaced from surface S thereby levitating the plate 34 above the surface S of the face plate 20. The plate 34 achieves a position of equilibrium of all the forces on the nozzle and maintains the nozzle 25 in predetermined relation to the surface. It should be noted that although the principal area against which ambient or atmospheric pressure is applied comprises plate 34, other areas of the stem 26 also have ambient or atmospheric pressure applied thereto and all the areas combined produce the force which is balanced by the pressure force beneath plate 34.

As the plate 20 is moved relative to the nozzle 25, the nozzle 25 including its stem 26 is displaced upwardly or downwardly relative to the housing 27 since it tends to remain in predetermined relative levitated position with respect to the surface S. Thus, the position of the nozzle 25 is indicative of the variations in the position or contour of the surface S.

An indicator 36, preferably a differential transformer, is utilized to sense the position of the nozzle 25. The electrical signal produced by the differential transformer 36 is amplified by an amplifier 37 and passes to a demodulator. The signal can be continuously recorded on the recorder 38. In addition, the signal can be directed to a visual gauge 39 to continuously visually indicate the position of the nozzle 25. The gauge 39 can be provided with suitable switches so that a reject signal is produced to energize a reject device 40 when the nozzle deviates more than a predetermined amount from a standard.

It has been found that the accuracy is not adversely affected by variations in pressure. Thus, tests have shown that with a nozzle opening of 0.062 inch, the pressure of air may vary from 6 to 15 pounds per square inch gauge and the accuracy will be within 0.001 inch. Under these conditions the nozzle is leviated at about 0.0015 inch above the surface. If the pressure is changed substantially, the distance that the nozzle is leviated above the surface is changed but the accuracy is maintained. If greater accuracy is desired, then the pressure should be controlled more carefully.

The utilization of the sensing devices 24 shown in FIG. 3 thereby produces an accurate gauging of the surface S of the face plate 20.

An apparatus for inspecting the internal viewing surface of a face plate is shown in FIGS. 4–10. Referring to FIG. 4, the apparatus comprises a frame 41 consisting of a base 42, spaced uprights 43 and a top cross member 44. A table 45 is mounted for movement upwardly and downwardly for moving a face plate 20 to and from gauging position. As shown in FIGS. 4 and 6, the table 45 is mounted on a vertical shaft 46 which is supported for vertical movement on the base 42 by counterweights 47 by roller chains 49 trained over sprockets 50, 51 and connected to a bracket 48 on the lower end of shaft 46. Shaft 46 is provided with a gear rack 52 that meshes with a gear 53 on a horizontal shaft 54 journalled in base 42. A hand wheel 55 is fixed on shaft 54. By rotation of the hand wheel 55, the shaft 46 can be raised and lowered. As shown in FIG. 6, the face plate is supported on the table 45 during its movement upwardly and downwardly by an inflated resilient ring 56 much like the inner tube of an automobile tire. Circumferentially spaced arms 57 extend upwardy and have plastic ends 58 to provide a general lateral restraint for the face plate 20 and thereby assist the general positioning of the face plate on the table 45.

When a face plate 20 is positioned on table 45 and the table 45 is elevated by rotation of the hand wheel 55, the face plate 20 is brought into position adjacent a support 60. As shown in FIGS. 5 and 6, support 60 is journalled by bearings 62 on a shaft 61 which is fixed on cross member 44 and extends downwardly. The support 60 includes a plurality of radially extending arms 63. Each arm 63 supports a lever 64 pivoted about a horizontal axis on a bracket 65 fixed on the end of arm 63. The lower end of each arm 64 is yieldingly urged radially outwardly by a spring 66 interposed between the upper end of each arm 64 and an adjustable stop 67 on a threaded shaft 68.

The lower end of each arm 64 is formed with an opening 69 adapted to engage one of the studs 23 on the flange 22 of the face plate 20 (FIG. 6). An air cylinder 70 is mounted on a bracket 71 on support 60 adjacent each arm 64 and when actuated, the piston thereof projects outwardly against the upper end of each arm 64 to move the lower end of each arm 64 inwardly out of engagement with its stud 23.

Thus, when the table 45 is elevated to bring a face plate into position, air cylinders 70 are actuated to move the lower ends of the arms 64 out of position. When the table 45 is in position, the cylinders 70 are de-energized permitting the springs 66 to urge the lower end of the arms 64 outwardly and thereby engage the openings 69 in the studs 23. The table is then lowered so that the face plate 20 remains supported in predetermined position with respect to fixed points, namely, the studs 23, which are utilized in subsequent manufacture of the cathode ray tube as reference points.

Referring to FIGS. 6, 8 and 9, a sensing head 75 is mounted on the lower end of shaft 61 in fixed relation and comprises a mounting bracket 76 on which a plurality of sensing devices 80 are positioned. Each device 80 is of a general construction corresponding to the sensing device 24 previously described in connection in FIG. 3. As shown in FIGS. 8 and 9, the sensing devices 80 are positioned at radially spaced points with respect to the face plate 20 so that when the support 60 is rotated to rotate the face plate 20, after the table 45 has been lowered, circumferential portions of the surface S are gauged.

Referring to FIG. 10, each sensing device 80 includes a housing 81 that is supported on the mounting bracket 76 by a screw 81a. A sensing nozzle 82, preferably made of plastic such as Delrin, is threaded on the lower end of a sensing stem 83 which is mounted for reciprocating movement in housing 81. The nozzle 82 is formed with an opening 84 which communicates with an axial opening 85 in the sensing stem 83. A portion of the stem 83 is cut away as designated by the numeral 86 to provide a chamber 87 into which air is supplied from a pressurized source, not shown, through a hose 88, connector 89 and an opening 90 in the housing 81. The sensing stem 83 is provided with a radial opening 91 providing communication between the chamber 87 and the interior 85 of the stem. The sensing nozzle 82 is formed with a shoulder 92 that defines a surface against which ambient or atmospheric pressure is applied. Ambient or atmospheric pressure is also applied against other exposed portions of the stem 83. In addition, the area adjacent the open end of the opening 84 is cut away or recessed as at 93.

When air is supplied through nozzle 84, the air passes laterally and radially outwardly between the end of the nozzle 82 and the surface S. The combined action of ambient pressure force and the pressure force of fluid flowing through the nozzle and fluid flowing between the end of the nozzle 82 and the surface S causes the nozzle 82 to levitate and immediately achieve an equilibrium position in predetermined spaced relation to the surface S. As the face plate 20 is rotated, and as variations in contour or position of the surface S occur, the nozzle 82 moves upwardly or downwardly relative to housing 81 because it tends to maintain a predetermined spaced relation with the surface S. This spacing remains virtually constant through a wide range of air pressure variation.

A differential transformer is mounted on the upper end of the housing 81 to continuously sense the position of the nozzle relative to the housing. As shown in FIG. 10, a transformer bushing 95 is threaded into the upper end of the housing 81 and the windings of the differential transformer 96 are mounted in the bushing 95. The armature 97 of the differential transformer is threaded into the upper end of the sensor stem 83, which must be fabricated of non-magnetic material. A cap 98 is threaded over the transformer bushing to retain the transformer in fixed position and the wiring 99 of the transformer extends outwardly through a rubber grommet 100. A relief hole 95a is provided in the transformer bushing 95 to prevent the build up of pressure due to leakage around the stem. The transformer bushing 95 is threaded into housing 81 to permit adjustment in order to obtain a zero setting.

A light coil spring 101 is interposed between the transformer and a shoulder 102 on the sensor stem 83 to tend to yieldingly urge the nozzle 82 outwardly.

Spring 101 assists gravity in urging the nozzle 82 outwardly. When the nozzle 82 is mounted at an angle to the vertical, the spring 101 assists in overcoming any tendency of friction to prevent movement of the nozzle of the sensing device 80' outwardly. When the sensing device 80 is mounted generally vertical, spring 101 may be omitted.

As shown in FIG. 6, one of the sensing devices 80' is provided for sensing the internal surface of the upright flange 22 adjacent the area of juncture of the flange 22 and the viewing portion 21. In order to provide proper clearance during loading and unloading of the face plate 20 on arms 64, the sensing device 80' is mounted on a piston of an air cylinder 105 so that it can be projected into and out of position for sensing.

In order to indicate to an operator who rotates the support 60 manually that a complete revolution has occurred, a detent recess 106 (FIG. 7) is provided on a flange 107 on the support 60 and a detent roller 108 is mounted on an arm 109 which is yieldingly urged downwardly by a spring 110 that tracks along the flange 107 and engages the detent recess 106 so that when the support 60 is rotated, the detent roller 108 will move out of the detent recess and back into the detent recess in one revolution. Limit switch 111 is actuated by movement of detent roller 108 to prevent actuation of solenoid valve 131 which, in turn, actuates cylinders 70 and 105 except when the clamp arms 64 are properly oriented with respect to cylinders 70.

In the pneumatic diagram shown in FIG. 12, it can be seen that the air supplied to the sensing devices 80 is controlled by a solenoid operated valve 130 whereas the air supplied to the clamping cylinders 70 and the cylinder 105 for positioning sensing device 80' is controlled by a solenoid operated valve 131.

Referring to FIGS. 11 and 12, at the beginning of the gauging cycle, the "clamp-open" push button is depressed to energize solenoid valve 131 and, in turn, direct fluid pressure to the clamping cylinders 70 which operate to swing the lower ends of the support arm 64 inwardly. At the same time, fluid pressure from cylinder 105 is directed to the atmosphere thereby retracting sensing device 80'. During normal operation, the air on-off push button is closed energizing solenoid 131 and directing fluid pressure to the nozzles of the sensing device. When no article to be inspected is in position for gauging, the jet effect from the air being expelled from the nozzles retracts the nozzles.

With the support arms open and the nozzles retracted, the apparatus is ready for loading and the article to be inspected, namely, the face plate 21 is raised into position. The "clamp-close" push button is compressed thereby de-energizing solenoid 131. The fluid pressure is then directed to the atmosphere to permit the springs 66 to swing the lower ends of the arms 64 outwardly into engagement with the pins 23. At the same time, fluid pressure is directed to cylinder 105 extending the sensing device 80' to gauging position. At this time the nozzles of all the sensing devices 80, 80' are retracted due to the jet effect. The reset button is then depressed to de-energize solenoid 130. The jet effect is thereby diminished and the combined action of gravity and spring 101 moves the nozzles adjacent the surface S. When the reset button is released, solenoid 130 is energized to direct fluid pressure to the nozzles. In this position the nozzles are levitated to predetermined gauging positions and reach an equilibrium because of the combined action of atmospheric pressure and fluid pressure. The face plate is then rotated to gauge the entire surface S.

In the form of the invention shown diagrammatically in FIG. 13, the sensing device 140 is supported in fixed relation to a support 141 so that the thickness of an article A is gauged and any variations in thickness will be evident by variations in the output of the differential transformer.

In the form of the invention shown in FIG. 14, a pair of sensing devices 142, 143 are provided adjacent the surfaces of a continuously moving article such as a web B of metal or paper. The nozzles of the devices are supported by the fluid pressure in predetermined levitated relation to the surfaces of the web B. The difference in the readings between the differential transformer of the sensing devices 142, 143 is a continuous indication of the thickness.

In the form of the invention shown in FIG. 15, the sensing devices 144, 145 are positioned adjacent the surfaces of a moving web W and the movement of the nozzles is interconnected by links 146 that are, in turn, connected to winding 147 and armature 148 of the differential transformer so that the output of the differential transformer is indicative directly of the thickness of the web as the web moves between the nozzles of the sensing devices 144, 145.

In the form of gauging heads shown in FIGS. 16 and 17, the force of atmospheric pressure on the nozzle is replaced by a positive pressure force. Specifically, sensing head 150 comprises a housing 151 that is supported on a bracket 152. The sensing nozzle 153 is positioned within an opening 154 in the housing 151. The nozzle 153 includes an upper pressure surface 155 against which air under constant pressure is supplied from a source through an inlet pipe 156 that directs the air into the upper part of the chamber 154. Nozzle 153 includes a portion 157 of reduced cross section that cooperates with the housing 150 to form a secondary chamber 158. Air is introduced tangentially through pipes 159 to the chamber 158 and passes through opposed openings 160 in the portion 157 of nozzle 153 through the hollow nozzle and out of an outlet opening 161 in the lower end. The air under pressure thereafter flows laterally between the lower end of the nozzle and the surface of the article S being engaged. The armature 162 of the differential transformer 163 is mounted on the upper end of the nozzle 153. Fluid from above the nozzle and from the chambers 158 is permitted to flow between the upper enlarged end of the nozzle to an annular collecting chamber 164 and thereafter to an outlet 165 creating an air bearing for the upper end of the nozzle. By this arrangement, the pressure above the nozzle and the pressure in the chamber 158 may differ in magnitude.

As in the previous forms of the invention, when air is supplied through pipes 156 and 159 and the nozzle is adjacent the surface S, the nozzle achieves a position of equilibrium due to the pressure force on the surface 155, and the pressure forces due to fluid flowing through opening 161 and between the lower end of the nozzle and the surface S.

In this form of gauging head, the gauging is unaffected by changes in atmospheric pressure. The provision of tangential inlets 159 minimizes any tendency for creating lateral dynamic forces on the nozzle. The term ambient as used herein is intended to cover the application of a fluid pressure force due to atmospheric as well as a separately applied fluid pressure.

The invention is readily applicable to inspecting planar, concave or convex surfaces by arranging a series of nozzle assemblies in suitable array. Also each nozzle is capable of widespread limits of measurement with a comparable degree of accuracy throughout the range of measurement. The nozzles are capable of being precisely positioned repeatedly so that accurate reproducible results are achieved.

I claim:

1. An apparatus for inspecting the surface of an article which comprises
   a support for said article,
   a sensing nozzle,
   said nozzle having an end with an outlet opening,
   a housing for supporting said sensing nozzle for movement toward and away from said surface with said outlet opening of said sensing nozzle adjacent the surface of the article,
   said housing having a chamber therein,
   said nozzle having a hollow stem projecting into said chamber and freely movable relative to said housing,
   means for supporting said housing in relatively axially fixed relation to said support during gauging,
   said nozzle having an opening providing communication between said chamber and said outlet opening,
   means for directing a fluid through said chamber to said nozzle and from said outlet opening against said surface,
   means for applying a force to said nozzle in the direction of issuance of said fluid from said outlet opening whereby said nozzle is levitated in predetermined relation to the surface by the combined action of said force and the forces due to fluid flowing from said outlet opening and due to fluid flowing laterally between said nozzle end and said surface,
   and means for sensing the position of said nozzle.

2. An apparatus for inspecting the internal surface of a cathode ray tube face plate which comprises
   a support for said face plate,
   a head,
   a plurality of sensing nozzles,
   each said nozzle having an outlet opening therein,
   a plurality of housings on said head,
   means for supporting each said nozzle in a housing on said head for movement toward and away from said support with said outlet opening adjacent a surface of the article to be gauged when an article is on the support,
   means for supplying fluid to said outlet opening of each said nozzle whereby a jet of fluid is directed from each said nozzle against the surface of the face plate and passes between the end of said nozzle and the surface of the face plate,
   each said nozzle having an area against which ambient pressure is applied whereby when fluid is applied, each said nozzle is suspended in predetermined spaced relation to the surface by the combined action of the force due to ambient pressure and each said forces due to fluid flowing from said nozzle and due to fluid flowing between the end of said nozzle and the surface,
   means for sensing the relative positions of said nozzles with respect to their supporting means,
   means for moving said face plate support toward and away from said head for moving a face plate into and out of sensing position,
   means adjacent said head for engaging said face plate to support the face plate in position for inspection,
   and means for rotating said last-mentioned means relative to said head about an axis generally perpendicular to said internal surface of the face plate to cause said sensing nozzles to traverse successive circumferential portions of the surface of the face plate.

3. The combination set forth in claim 2 wherein said means for supporting said face plate adjacent said head comprises
   a plurality of circumferentially spaced arms,
   means for supporting each said arm for movement outwardly into engagement with a stud on the flange of the face plate.

4. The combination set forth in claim 2 wherein said means for supplying fluid to each said nozzle includes means for momentarily interrupting the supply of fluid.

5. An apparatus for inspecting the surface of an article which comprises
   a support for said article,
   a sensing nozzle,
   said nozzle having an outlet opening therein,
   a housing for supporting said sensing nozzle adjacent said support for movement toward and away from said surface with said outlet opening adjacent a surface of the article to be gauged when an article is on the support,
   said nozzle having an area thereon spaced from said opening against which ambient pressure is applied,
   said housing having a chamber therein,
   said nozzle having a hollow stem projecting into said chamber and freely movable relative thereto, said nozzle having an opening providing communication between said chamber and the outlet opening in said nozzle,
   means for supporting said housing in relatively axially fixed relation to said support during gauging,
   means for directing a fluid through said chamber to said nozzle and from said nozzle against said surface whereby said nozzle is levitated in predetermined relation to the surface by the combined action of the force due to ambient pressure on said area and the forces due to said fluid flowing from said outlet opening and due to said fluid flowing laterally between said nozzle end and said surface,
   and means for sensing the position of said nozzle in said housing.

6. An apparatus for inspecting the internal surface of a cathode ray tube face plate which comprises
   a support for said face plate,
   a plurality of sensing nozzles,
   each said nozzle having an outlet opening therein,
   a housing for each said nozzle in which each said nozzle is supported for movement toward and away from said support with said outlet opening adjacent a surface of the article to be gauged when an article is on the support,
   each said housing having a chamber therein,
   each said nozzle having a hollow stem projecting into each said chamber and an opening providing communication between each said chamber and the outlet opening in each said nozzle,
   each said nozzle being freely movable relative to each said housing,
   means for supporting each said housing in relatively axially fixed relation to said support during gauging,
   means for supplying fluid through each said chamber to each said nozzle opening whereby a jet of fluid is directed from each said nozzle against the surface of the face plate and passes between the end of each said nozzle and the surface of the face plate, each said nozzle having an area against which ambient pressure is applied whereby when fluid is applied, each said nozzle is levitated in predetermined space relation to the surface by the combined action of the force due to ambient pressure and the forces due to said fluid flowing from each said outlet opening and due to said fluid flowing laterally between the end of each said nozzle and the surface, and means for sensing the relative positions of said nozzles with respect to their housings.

7. The combination set forth in claim 6 including means for causing relative movement between said face plate and said nozzles about an axis generally perpendicular to the internal surface of the face plate to thereby inspect circumferential portions of the surface of the face plate.

8. An apparatus for inspecting the internal surface of a cathode ray tube face plate which comprises a support for said face plate, a head, a plurality of sensing nozzles, each said nozzle having an outlet opening therein, a housing for each said nozzle in which each said nozzle is supported for movement, means for supporting each said housing on said head adjacent the surface of the face plate such that said nozzles are movable toward and away from said support with each said outlet opening adjacent a surface of the article to be gauged when an article is on the support, each said housing having a chamber therein, each said nozzle having a hollow stem projecting into each said chamber and an opening providing communication between each said chamber and the outlet opening of each said nozzle, means for supplying fluid through said chamber to each said outlet opening whereby a jet of fluid is directed from each said nozzle against the surface of the face plate and passes between the end of each said nozzle and the surface of the face plate, each said nozzle having an area against which ambient pressure is applied whereby when fluid is applied, each said nozzle is suspended in predetermined spaced relation to the surface by the combined action of the force of ambient pressure and the forces due to said fluid flowing out of each said nozzle and due to said fluid flowing between each said nozzle and the surfaces, means for sensing the relative positions of the nozzles with respect to their housings, means for moving said face plate support toward and away from said head for moving a face plate into and out of sensing position, means adjacent said head for engaging said face plate to support the face plate in position for inspection, and means for rotating said last-mentioned means relative to said head about an axis generally perpendicular to said internal surface of said face plate to cause said sensing nozzle to transverse successive circumferential portions of the surface of the face plate.

9. The combination set forth in claim 8 wherein said means for supporting said face plate adjacent said head comprises a plurality of circumferentially spaced arms, means for supporting each said arm for movement outwardly into engagement with a stud on the flange of the face plate.

10. The combination set forth in claim 8 including means for creating a reject signal when the position of any nozzle deviates from a predetermined standard.

11. A sensing assembly for inspecting the surface of an article which comprises a sensing nozzle having a fluid outlet opening therein, a housing in which said nozzle is positioned said housing having a chamber therein, said nozzle having a hollow stem projecting into said chamber and an opening providing communication between said chamber and the outlet opening of said nozzle, said nozzle being freely movable relative to said housing, means for supplying fluid to said chamber and, in turn, to the outlet of said nozzle, said nozzle having an area spaced from the end thereof against which atmospheric pressure is applied such that when fluid is supplied to said nozzle, said nozzle is leviated in predetermined relation to the surface of the article being gauged by a combined action of the force of atmospheric pressure on said area and the forces due to fluid flowing out of said outlet opening and the fluid flowing laterally between the end of said nozzle and the surface of the article being gauged.

12. The combination set forth in claim 1 wherein said means for directing fluid into said chamber supplies fluid tangentially to said chamber.

13. The method of insepcting the internal surface of a cathode ray tube face plate which comprises moving a cathode ray tube face plate toward a plurality of sensing nozzles such that the sensing nozzles are adjacent radially spaced points along the internal surface of the face plate, supporting each sensing nozzle for movement toward and away from said surface, directing a jet of pressurized fluid from each said nozzle against said surface such that said nozzle is leviated in predetermined spaced relation to said surface by the combined action of the force due to ambient pressure on said nozzle and the forces due to fluid flowing out of said nozzle and due to fluid flowing between the end of said nozzle and said surface, causing relative rotational movement between said nozzles and said surface about an axis generally perpendicular to said surface such that successive circumferential portions of said face plate are successively gauged by said nozzles, creating a reject signal when the position of a nozzle deviates from a predetermined standard, and thereafter moving the face plate away from said sensing nozzles.

14. The method of gauging the relative position of the surface of an article which comprises positioning a housing in fixed relation adjacent the surface of the article to be gauged, supporting a nozzle having an opening in the end thereof in said housing for relatively free movement with respect to said housing in a normal direction toward and away from said surface, providing a chamber in said housing for supplying fluid to said nozzle, supplying fluid under pressure to said chamber, causing said fluid to flow from said chamber to said nozzle, directing a jet of said fluid from said nozzle opening against said surface such that said nozzle is levitated in predetermined spaced relation to said surface by the combined action of the force due to ambient pressure on said nozzle and the forces due to said fluid flowing out of said nozzle opening and due to said fluid flowing laterally between said nozzle and said surface, and sensing the position of said nozzle.

15. A sensing assembly for inspecting the surface of an article which comprises a sensing nozzle having a fluid outlet opening therein, a housing in which said nozzle is positioned, said housing having a chamber therein, said nozzle having a hollow stem projecting into said chamber and an opening providing communication between said chamber and the outlet opening of said nozzle, said nozzle being freely movable relative to said housing, means for supplying fluid to said chamber and, in turn, to the outlet opening of said nozzle, said nozzle having an area spaced from the end thereof against which ambient pressure is applied such that when fluid is supplied to said nozzle, said nozzle is levitated in predetermined relation to the surface of the article being gauged by a combined action of the force of ambient pressure on said area and the forces due to fluid flowing out of said outlet opening and the fluid flowing laterally between the end of said nozzle and the surface of the article being gauged.

16. A sensing assembly for inspecting the surface of an article which comprises a sensing nozzle having a fluid outlet opening therein, a housing in which said nozzle is positioned, said housing having a chamber therein, said nozzle having a hollow stem projecting into said chamber and an opening providing communication between said chamber and the outlet opening of said nozzle, said nozzle being freely movable relative to said housing, means for supplying fluid to said chamber and, in turn, to the outlet opening of said nozzle, and means for applying a force to said nozzle in the direction of issuance of said fluid from said opening whereby said nozzle is levitated in predetermined relation to the surface of the article being gauged by the combined action of said force and the forces due to fluid flowing from said outlet opening and due to fluid flowing laterally between said nozzle and the surface of the article being gauged.

17. The method of gauging the relative position of the surface of an article which comprises positioning a housing in fixed relation adjacent the surface of the article to be gauged, supporting a nozzle, which has a bore and an opening in the outlet end thereof, within said housing for relatively free movement with respect to said housing in a direction toward and away from said surface, providing a chamber in said housing for supplying fluid to said nozzle, supplying fluid under pressure to said chamber, causing said fluid to flow from said chamber into said nozzle bore, directing a jet of said fluid from said nozzle opening against said surface, applying a force to said nozzle in the direction of issuance of said jet of fluid from said nozzle opening such that said nozzle is levitated in constant spaced relation to said surface by the combined action of said force on said nozzle and the forces due to said fluid flowing from said nozzle opening and due to said fluid flowing laterally between said nozzle and said surface, and sensing the relative position of said nozzle.

References Cited

UNITED STATES PATENTS

| | | | |
|---|---|---|---|
| 1,946,924 | 2/1934 | Allen et al. | 73—37.7 |
| 3,068,581 | 12/1962 | Skalwold et al. | 33—174 |
| 3,190,007 | 6/1965 | De Nicola et al. | 73—37.5 |
| 3,194,055 | 7/1965 | Knobel | 73—37.5 |

LEONARD FORMAN, *Primary Examiner.*

S. S. MATTHEWS, *Examiner.*